(12) United States Patent
Asemann (10) Patent No.: US 12,250,112 B2
(45) Date of Patent: Mar. 11, 2025

(54) REPRODUCING A STATE OF A SYSTEM AND A NETWORK UPON OCCURRENCE OF AN ERROR

(71) Applicant: Elektrobit Automotive GmbH, Erlangen (DE)

(72) Inventor: Peter Asemann, Sindelfingen (DE)

(73) Assignee: Elektrobit Automotive GmbH, Erlangen (DE)

( * ) Notice: Subject to any disclaimer, the term of this patent is extended or adjusted under 35 U.S.C. 154(b) by 524 days.

(21) Appl. No.: 17/837,614

(22) Filed: Jun. 10, 2022

(65) Prior Publication Data
US 2022/0417079 A1 Dec. 29, 2022

(30) Foreign Application Priority Data
Jun. 28, 2021 (EP) .................................... 21181992

(51) Int. Cl.
*H04L 41/069* (2022.01)
*H04L 43/10* (2022.01)

(52) U.S. Cl.
CPC ............ *H04L 41/069* (2013.01); *H04L 43/10* (2013.01)

(58) Field of Classification Search
None
See application file for complete search history.

(56) References Cited

U.S. PATENT DOCUMENTS

| | | | |
|---|---|---|---|
| 8,117,600 B1 | 2/2012 | Roeck et al. | |
| 8,972,794 B2* | 3/2015 | Wilding | ................ G06F 11/366 714/45 |
| 2011/0078666 A1 | 3/2011 | Altekar | |
| 2015/0378870 A1 | 12/2015 | Marron et al. | |
| 2016/0299799 A1* | 10/2016 | De Smet | ................ G06F 8/4443 |
| 2024/0080927 A1* | 3/2024 | Christoffersson | ..... H04W 76/27 |

OTHER PUBLICATIONS

Search Report dated Jan. 5, 2022 from corresponding European patent application No. 21181992.5.

* cited by examiner

*Primary Examiner* — Angela Nguyen (57) ABSTRACT

A state of a system and a network is reproduced upon occurrence of an error. A state of the system is continuously recorded for a time window. Furthermore, a network log for the network is generated. When a network condition indicative of an error or an internal condition indicative of an error is detected, at least a part of the recorded state of the system is stored together with a fitting portion of the network log for the network.

36 Claims, 5 Drawing Sheets

REPRODUCING A STATE OF A SYSTEM AND A NETWORK UPON OCCURRENCE OF AN ERROR

BACKGROUND

The present invention is related to a method, a computer program code, and an apparatus for reproducing a state of a system and a network upon occurrence of an error.

In the field of embedded computing a problem exists in that occurrence of an error is detected, e.g. from logs of the network traffic, but the error cannot be reproduced and analyzed once it has occurred. As there could be many reasons why operation of a system failed, e.g. operation of a processor or a system-on-chip, it is common that a group of developers tries to reproduce the issue for weeks or months before it is spotted again. This is a very cumbersome process and a huge issue for errors that appear only sporadically.

It is an object of the present invention to provide an improved solution for reproducing a state of a system and a network upon occurrence of an error.

BRIEF SUMMARY

This object is achieved by a method, by a computer program code, which implements this method, and by an apparatus according to the independent claims. The dependent claims include advantageous further developments and improvements of the present principles as described below.

According to a first aspect, a method for reproducing a state of a system and a network upon occurrence of an error comprises the steps of:
  continuously recording a state of the system for a time window;
  generating a network log for the network;
  detecting a network condition indicative of an error or an internal condition indicative of an error; and
  storing at least a part of the recorded state of the system together with a fitting portion of the network log for the network.

Accordingly, a computer program code comprises instructions, which, when executed by at least one processor, cause the at least one processor to perform the following steps for reproducing a state of a system and a network upon occurrence of an error:
  continuously recording a state of the system for a time window;
  generating a network log for the network;
  detecting a network condition indicative of an error or an internal condition indicative of an error; and
  storing at least a part of the recorded state of the system together with a fitting portion of the network log for the network.

The term computer has to be understood broadly. In particular, it also includes workstations, embedded devices and other processor-based data processing devices.

The computer program code can, for example, be made available for electronic retrieval or stored on a computer-readable storage medium.

According to another aspect, an apparatus for reproducing a state of a system and a network upon occurrence of an error comprises:
  a system analyzing means configured to continuously record a state of the system for a time window and to detect an internal condition indicative of an error;
  a network analyzing means configured to generate a network log for the network and to detect a network condition indicative of an error; and
  a storage device configured to store at least a part of the recorded state of the system together with a fitting portion of the network log for the network.

The invention combines continuously recording an image of the inner state of a system, e.g. a window of some seconds or optionally the whole development of the state from the time the system is started, with recording network traffic. In case an error is detected, a relevant part of the recorded information is frozen and persisted. This allows reproducing and analyzing the error conditions or faults inside the system, which caused the occurrence of the error. An advantage of the described solution is that error conditions becoming visible in the network traffic or being visible for the system can be analyzed and debugged and possibly reproduced right away, without a need to wait for the issue to reappear.

In an advantageous embodiment, the network log for the network is generated by a network tracer. Network tracers are established tools for analyzing network traffic and are readily available for a wide range of network types. Preferably, the network condition indicative of an error is detected by the network tracer. In this way, there is no need to provide an additional module or software component for evaluating the network conditions.

In an advantageous embodiment, the network condition indicative of an error includes at least one of a duplicate packet, a broken packet, and a packet not matching an assumed protocol state. For example, a broken packet may be determined from at least one of a wrong cyclic redundancy code, a wrong length, and a wrong message authentication code. Packets not matching an assumed protocol state can easily be detected if the network tracer can keep track of the protocol state or calculate the protocol state using a suitable model. An example for an assumed protocol state is connection open/closed in case of the transmission control protocol (TCP).

In an advantageous embodiment, the state of the system is recorded by a tracing debugger. Such tracing debuggers are able to record and store considerable parts of the internal state of a system, e.g. of an electronic control unit.

In an advantageous embodiment, an internal condition indicative of an error includes at least one of an exception, an illegal peripheral input value, and an error handling code being executed. In this way, not only errors visible in the network trigger the described mechanism, but also errors that are visible and relevant to the system in some way, such as errors in the directly connected peripherals, processor-internal errors and errors handled by the software.

In an advantageous embodiment, the state of the system is recorded in the form of snapshots and/or incremental logs. Both approaches enable to reconstruct the system state at a desired point in time in a reliable way.

In an advantageous embodiment, the recorded state of the system includes memory accesses, task changes, and code executions. This information will in general be sufficient to describe the inner working of the system.

In an advantageous embodiment, the network tracer is configured to signal the tracing debugger to store the state of the system at a defined point in time before the detected network condition indicative of an error and a state trace of the system until the point in time the network condition indicative of an error was detected. Alternatively, the system itself is configured to signal the tracing debugger to store the state of the system at a defined point in time before the internal condition indicative of an error was detected and a state trace of the system until the point in time the internal condition indicative of an error was detected. Likewise, the tracing debugger may be configured to detect the internal condition indicative of an error and to store the state of the system at a defined point in time before the internal condition indicative of an error was detected and a state trace of the system until the point in time the internal condition indicative of an error was detected. In this way, it is ensured that a usable system state and a relevant trace of the system state are available for a later analysis.

In an advantageous embodiment, information on network activity and inner working of the system is provided for analysis. The inner working of the system, i.e. the stored system state and the relevant trace of the system state, as well as the network activity, i.e. the network state and the trace of the network state, are preferably displayed in parallel for analysis. In this way, it is possible to pinpoint the specific condition that led to an error.

In an advantageous embodiment, a recorded state is restored on the system, and logged network traffic of remote communication partners is replayed. By restoring a recorded state on the system and replaying the logged network traffic, it can be checked if the resulting inner working of the system matches the recorded system trace and if the system reacts in the same way as in the network log. If this is the case, the scenario has been restored successfully and the error can be reproduced repeatedly.

In an advantageous embodiment, the recorded state is restored on the system with a modified software code. In this way, it is possible to test software fixes with all circumstances except for the modified code staying exactly the same. This dramatically reduces the time required for testing software fixes.

Further features of the present invention will become apparent from the following description and the appended claims in conjunction with the figures.

DETAILED DESCRIPTION

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, systems on a chip, microcontrollers, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

Figure 1:
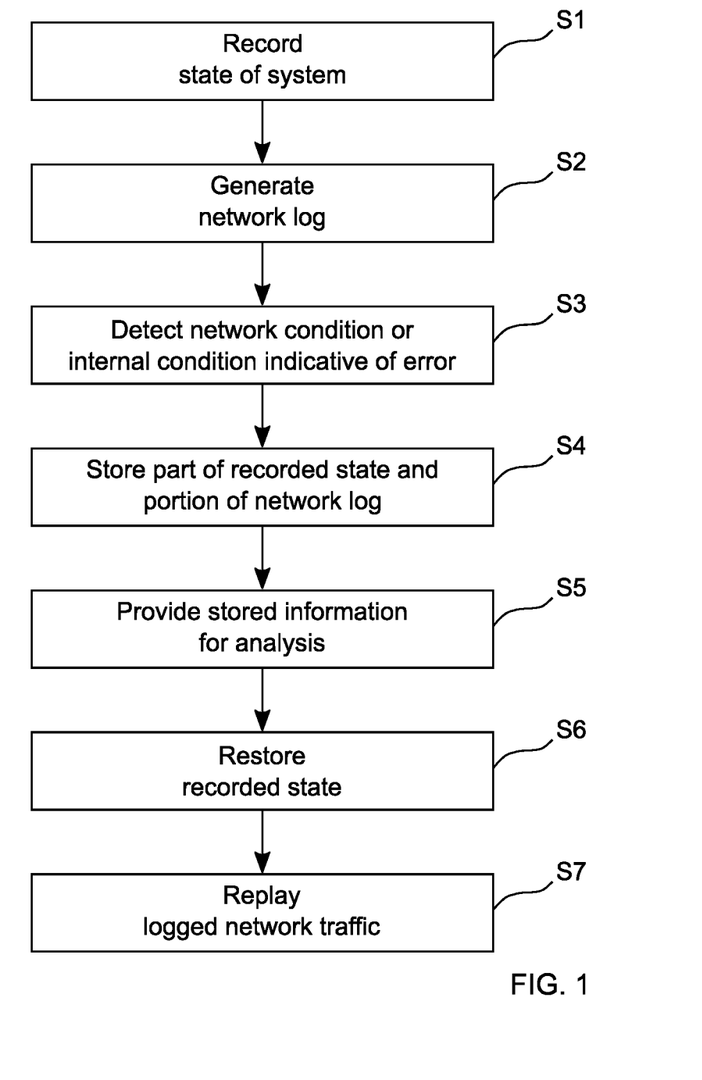
FIG. 1 schematically illustrates a method for reproducing a state of a system and a network upon occurrence of an error.

FIG. 1 schematically illustrates a method according to the invention for reproducing a state of a system and a network upon occurrence of an error. A state of the system is continuously recorded 51 for a time window, e.g. by a tracing debugger. Advantageously, the state is recorded in the form of snapshots and/or incremental logs and includes memory accesses, task changes, and code executions. Furthermore, a network log for the network is generated S2, e.g. by a network tracer. When a network condition indicative of an error is detected S3, preferably by the network tracer, or an internal condition indicative of an error is detected S3, preferably by the tracing debugger, at least a part of the recorded state of the system is stored S4 together with a fitting portion of the network log for the network. The network condition indicative of an error may include, for example, at least one of a duplicate packet, a broken packet, and a packet not matching an assumed protocol state. A broken packet is advantageously determined from at least one of a wrong cyclic redundancy code, a wrong length, and a wrong message authentication code. Advantageously, the network tracer is configured to signal the tracing debugger to store the state of the system at a defined point in time before the detected network condition indicative of an error and a state trace of the system until the point in time the network condition indicative of an error was detected S3. Alternatively, an internal condition indicative of an error, such as a processor exception, an invalid input, or an internal error handling code being executed, can trigger the tracing debugger to store the state of the system at a defined point in time before the detected internal condition indicative of an error and a state trace of the system until the point in time the internal condition indicative of an error was detected S3. Optionally, information on network activity and inner working of the system may be provided S5 for analysis. Furthermore, a recorded state may be restored S6 on the system and logged network traffic of remote communication partners may be replayed S7. If desired, the recorded state may be restored S7 on the system with a modified software code, e.g. for testing software fixes.

Figure 2:
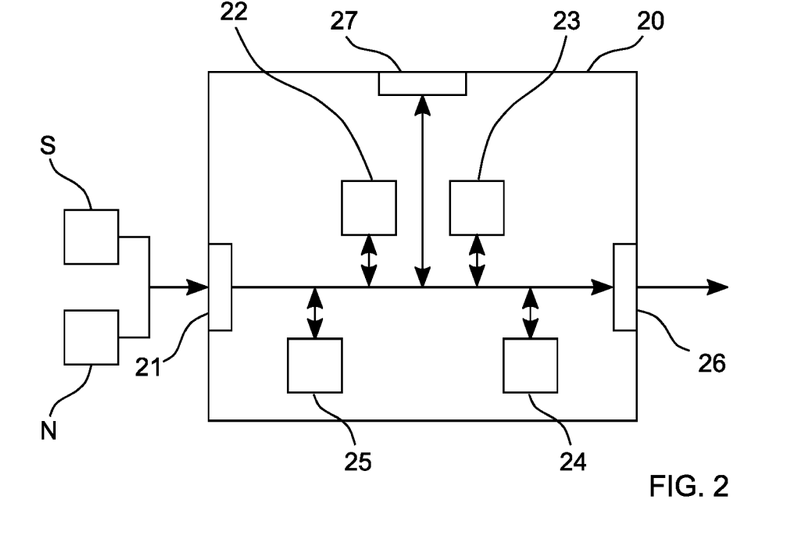
FIG. 2 schematically illustrates a first embodiment of an apparatus for reproducing a state of a system and a network upon occurrence of an error.

FIG. 2 schematically illustrates a block diagram of a first embodiment of an apparatus 20 according to the invention for reproducing a state of a system S and a network N upon occurrence of an error. The apparatus 20 has an input 21 for receiving data from the system S and the network N. The apparatus 20 further has a system analyzing means 22, e.g. a tracing debugger, configured to continuously record a state of the system for a time window. Preferably, the system analyzing means 22 is configured to detect internal conditions indicative of an error, such as processor exceptions, illegal input values, or the execution of an error handling code, and store the state of the system S at a defined point in time before the detected internal condition indicative of an error and a state trace of the system S until the point in time the internal condition indicative of an error was detected. Advantageously, the system analyzing means 22 is configured to record the state in the form of snapshots and/or incremental logs and includes memory accesses, task changes, and code executions. A network analyzing means 23, e.g. a network tracer, is configured to generate a network log for the network and to detect a network condition indicative of an error. The network condition indicative of an error may include, for example, at least one of a duplicate packet, a broken packet, and a packet not matching an assumed protocol state. A broken packet is advantageously determined from at least one of a wrong cyclic redundancy code, a wrong length, and a wrong message authentication code. A storage device 24 is provided for storing at least a part of the recorded state of the system together with a fitting portion of the network log for the network. Advantageously, the network analyzing means 23 is configured to signal the system analyzing means 22 to store the state of the system S at a defined point in time before the detected network condition indicative of an error and a state trace of the system S until the point in time the network condition indicative of an error was detected. Data stored on the storage device 24 may be made available for analysis via an output 26. Advantageously, the apparatus 20 is configured to restore a recorded state on the system S and to replay logged network traffic of remote communication partners. If desired, the recorded state may be restored on the system S with a modified software code, e.g. for testing software fixes.

The system analyzing means 22 and the network analyzing means 23 may be controlled by a control module 25. A user interface 27 may be provided for enabling a user to modify settings of the system analyzing means 22, the network analyzing means 23, and the control module 25. The system analyzing means 22, the network analyzing means 23, and the control module 25 can be embodied as dedicated hardware units. Of course, they may likewise be fully or partially combined into a single unit or implemented as software running on a processor, e.g. a CPU or a GPU.

Figure 3:
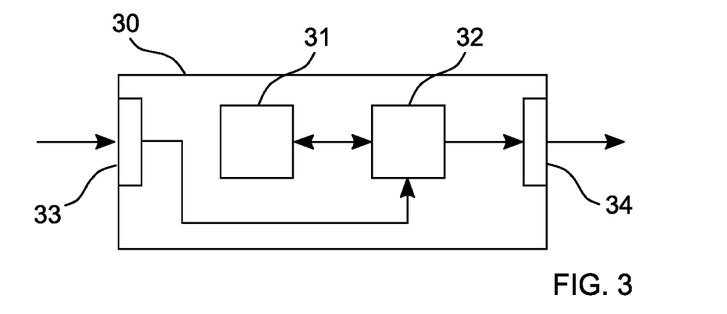
FIG. 3 schematically illustrates a second embodiment of an apparatus for reproducing a state of a system and a network upon occurrence of an error.

A block diagram of a second embodiment of an apparatus 30 according to the invention for reproducing a state of a system and a network upon occurrence of an error is illustrated in FIG. 3. The apparatus 30 comprises a processing device 32 and a memory device 31. For example, the apparatus 30 may be a computer, an electronic control unit or an embedded system. The memory device 31 has stored instructions that, when executed by the processing device 32, cause the apparatus 30 to perform steps according to one of the described methods. The instructions stored in the memory device 31 thus tangibly embody a program of instructions executable by the processing device 32 to perform program steps as described herein according to the present principles. The apparatus 30 has an input 33 for receiving data. Data generated by the processing device 32 are made available via an output 34. In addition, such data may be stored in the memory device 31. The input 33 and the output 34 may be combined into a single bidirectional interface.

The processing device 32 as used herein may include one or more processing units, such as microprocessors, digital signal processors, or a combination thereof.

The storage device 24 and the memory device 31 may include volatile and/or non-volatile memory regions and storage devices such as hard disk drives, optical drives, and/or solid-state memories.

In the following, further details of the invention shall be given with reference to FIG. 4 to FIG. 8.

Figure 4:
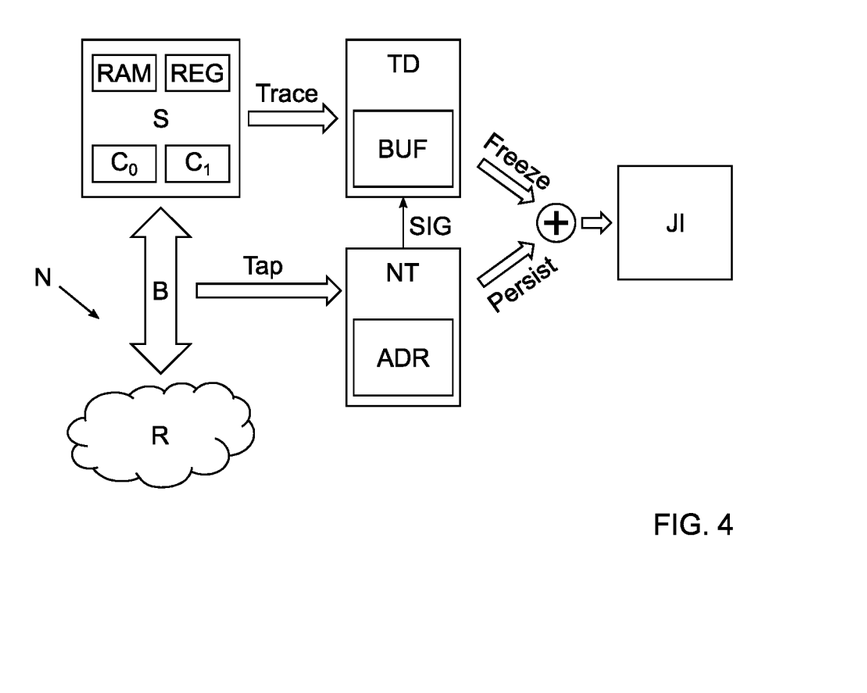
FIG. 4 schematically illustrates a system diagram of a solution according to the invention for reproducing a state of a system and a network upon occurrence of an error.

FIG. 4 schematically illustrates a system diagram of a solution according to the invention for reproducing a state of a system S and a network N upon occurrence of an error. In this example, the system S is a system-on-chip comprising a random access memory RAM, a number of registers REG, and two processing cores C0, C1. The system S is connected to a network N via a bus B. A tracing debugger TD performs a continuous transparent tracing of the system state. For this purpose, the tracing debugger TD comprises a buffer BUF, e.g. a dual ring buffer. A network tracer NT performs a continuous transparent tracing of network communication via a test access point (TAP). The network tracer NT makes use of a set of anomaly detection rules ADR for detecting a network condition indicative of an error. The tracing debugger TD may monitor if internal error conditions apply in the system-on-chip peripherals, if an internal error handling code is executed, which can be detected using watchpoints or breakpoints, or if an exception handler is called by a processing core. In case such a condition is detected, the trace of the system state is frozen and persisted together with a fitting porting of the network log of the detected error. For this purpose, the network tracer NT provides a signal SIG to the tracing debugger TD, which indicates a point in time at which to persist the system state. The result is a joint image JI of the state of the system S before the fault and a log of network system actions until appearance of the fault.

Figure 5:
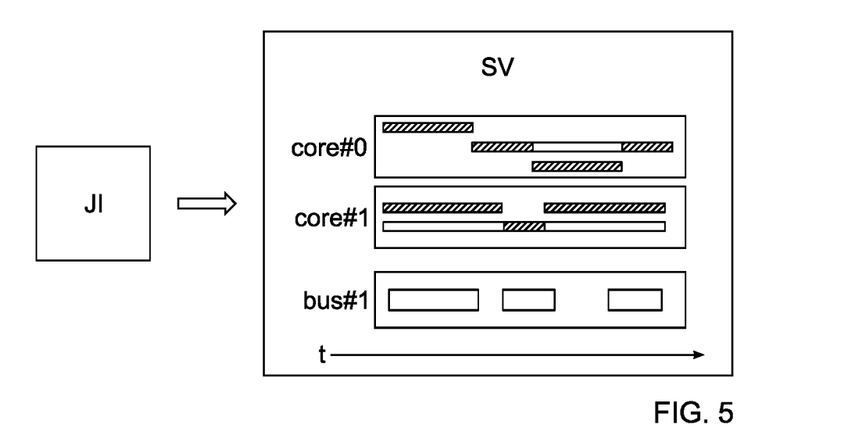
FIG. 5 schematically illustrates an analysis of a fault.

FIG. 5 schematically illustrates an analysis of a fault. The joint image JI of the state of the system S before the fault and a log of network system actions until appearance of the fault is made available for analysis, e.g. to a group of developers in charge of pinpointing the error condition. For this purpose, the network activity and the inner working of the system S over time t, including all memory accesses, task changes, and code executions, are displayed in parallel by an overall system viewer SV.

Figure 6:
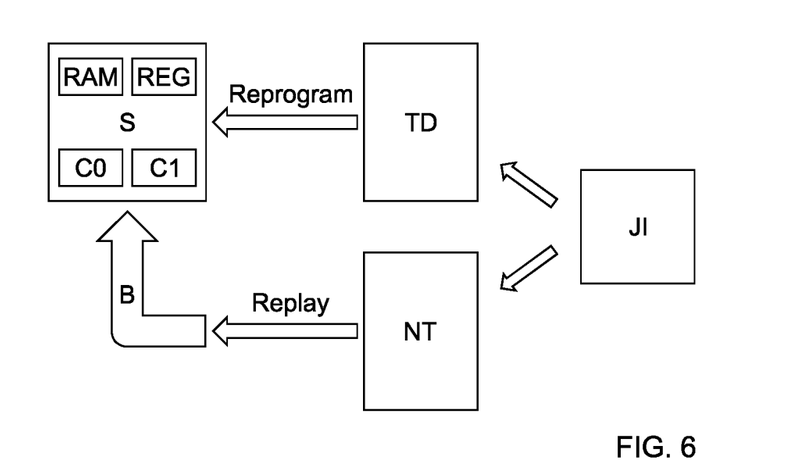
FIG. 6 schematically illustrates a live reproduction of a fault in the original system.

FIG. 6 schematically illustrates a live reproduction of a fault in the original system S. The joint image JI of the state of the system S before the fault and a log of network system actions until appearance of the fault is used for restoring a recorded state on the system S and for replaying logged network traffic of remote communication partners. In this way, it can be checked if the resulting inner working of the system matches the recorded system trace and if the system reacts in the same way as in the network log. If this is the case, the scenario has been restored successfully and the error can be reproduced repeatedly. In order to test software fixes, the recorded state can be restored on the system S with a modified software code. In this way, all circumstances except for the modified code stay exactly the same. This dramatically reduces the time required for testing software fixes.

Figure 7:
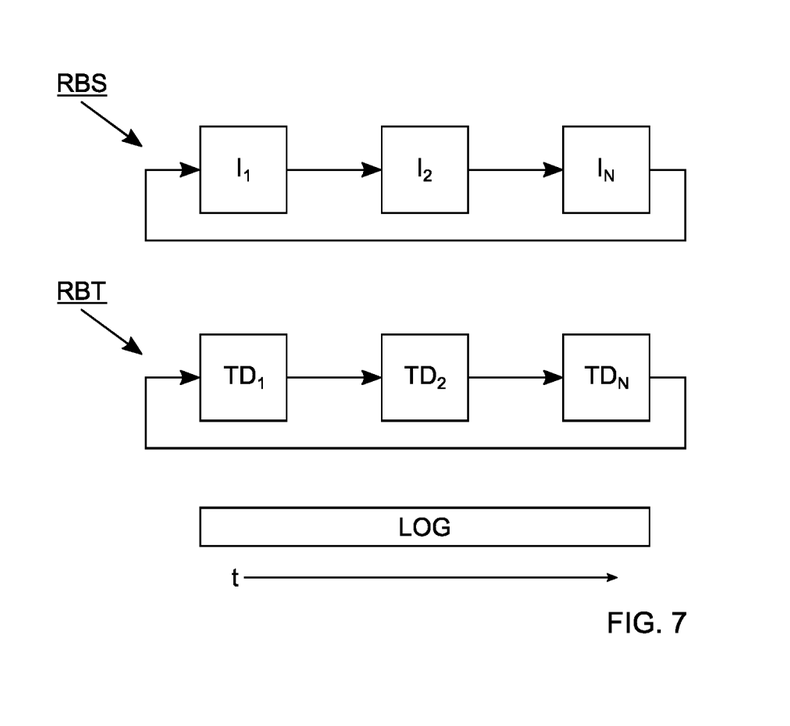
FIG. 7 schematically illustrates buffers used for recording the state of the system.

FIG. 7 schematically illustrates buffers RBS, RBT used for recording the state of the system. For recording of the complete system state a set of two ring buffers RBS, RBT is preferably used. The first ring buffer RBS is provided for complete system images I1-IN, whereas the second ring buffer RBT is provided for recording trace data TD1-TDN. Both ring buffers RBS, RBT have at least two pages. The number of pages is identical for both ring buffers RBS, RBT. The page sizes are chosen such that each page of the first ring buffer RBS can hold one complete image I1-IN of the state of the system and each page of the second ring buffer RBT can hold some seconds of the trace TD1-TDN of the changes to the state of the system. In addition, a continuous log LOG of network events and peripheral input is generated, i.e. a network/IO trace. All data is preferably time-stamped to enable the reconstruction of the system state by reproducing each change in the system.

Figure 8:
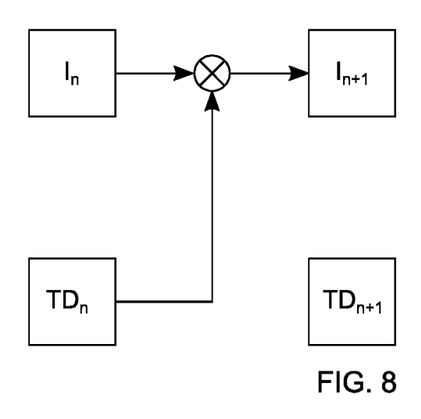
FIG. 8 schematically illustrates a process used for recording the state of the system.

FIG. 8 schematically illustrates an exemplary process used for recording the state of the system. In this example, continuously recording the state of the system is achieved as follows. First, the initial image of the state of the system is stored in the active storage page of the first ring buffer. Then the system is started and all changes to the system state are recorded, e.g. by a tracing debugger or similar means, and stored in the active page of the second ring buffer. If the active storage page of the second ring buffer is full, another page becomes the active page, and the recording of the state of the system continues in the new active page. In addition, a complete image In+1 of the state of the system at the moment when recording system changes switches to the new active page is calculated from the image In in the inactive page and all state changes stored as a trace tdn in the inactive page. This image In+1 is stored in the new active page of the first ring buffer. This process is continuously repeated. If no empty pages are available any more for the images and the trace data, the oldest pages are deleted and the recording process continues. This is done to reduce the amount of required storage, if storage is limited. By continuously recording complete images of the state of the system as well as trace data, the ring buffers always contains one or more recent images of the state of the system and a trace of the changes which took place after the point in time represented by the respective images of the state of the system. If an error is detected, all pages of the ring buffer are persisted in persistent memory, e.g. a hard disk, for later reproduction of the error condition.

If an error is detected at a given point in time Terr, the state of the system can be restored for any point in time Tx which is more recent than the earliest available image, by either taking the most recent image before this point in in time Tx and applying the changes recorded in the trace data, or by replaying the network/IO input recorded in the continuous log of network events and peripheral input from the time the used image was stored to time Tx. If both methods result in the same image, it can safely be assumed that the reconstructed state of the system at time Tx is accurate. The reconstructed state of the system at time Tx can, therefore, be taken as a starting point to reproduce the error at time Terr. By starting from this reconstructed state of the system and replaying the rest of the continuous log of network events and peripheral input reproduction of the error will most likely succeed. In case the error does not appear again, the saved trace buffer data may help to analyze why the error cannot be reproduced. This may help to find or catch spurious hardware errors or issues that are extremely critical with regard to timing.

The invention claimed is:

1. A method for reproducing a state of a system and a network upon occurrence of an error, the method comprising:
   continuously recording a state of the system for a time window;
   generating a network log for the network;
   detecting a network condition indicative of an error or an internal condition indicative of an error; and
   storing at least a part of the recorded state of the system together with a fitting portion of the network log for the network.

2. The method according to claim 1, wherein the network log for the network is generated by a network tracer.

3. The method according to claim 2, wherein the network condition indicative of an error is detected by the network tracer.

4. The method according to claim 3, wherein the network condition indicative of an error includes at least one of a duplicate packet, a broken packet, and a packet not matching an assumed protocol state.

5. The method according to claim 4, wherein the state of the system is recorded by a tracing debugger.

6. The method according to claim 5, wherein an internal condition indicative of an error includes at least one of an exception, an illegal peripheral input value, and an error handling code being executed.

7. The method according to claim 6, wherein the state of the system is recorded in the form of snapshots and/or incremental logs.

8. The method according to claim 7, wherein the recorded state of the system includes memory accesses, task changes, and code executions.

9. The method according to claim 8, wherein the network tracer is configured to signal the tracing debugger to store the state of the system at a defined point in time before the network condition indicative of an error was detected and a state trace of the system until the point in time the network condition indicative of an error was detected, or wherein the system is configured to signal the tracing debugger to store the state of the system at a defined point in time before the internal condition indicative of an error was detected and a state trace of the system until the point in time the internal condition indicative of an error was detected, or wherein the tracing debugger is configured to detect the internal condition indicative of an error and to store the state of the system at a defined point in time before the internal condition indicative of an error was detected and a state trace of the system until the point in time the internal condition indicative of an error was detected.

10. The method according to claim 9, further comprising providing information on network activity and inner working of the system for analysis.

11. The method according to claim 10, further comprising restoring a recorded state on the system and replaying logged network traffic of remote communication partners.

12. The method according to claim 11, wherein the recorded state is restored on the system with a modified software code.

13. A non-transitory computer-readable medium having stored thereon computer-executable instructions, which, when executed by at least one processor, cause the at least one processor to reproduce a state of a system and a network upon occurrence of an error by performing operations comprising:
continuously recording a state of the system for a time window;
generating a network log for the network;
detecting a network condition indicative of an error or an internal condition indicative of an error; and
storing at least a part of the recorded state of the system together with a fitting portion of the network log for the network.

14. The non-transitory computer-readable medium according to claim 13, wherein the network log for the network is generated by a network tracer.

15. The non-transitory computer-readable medium according to claim 14, wherein the network condition indicative of an error is detected by the network tracer.

16. The non-transitory computer-readable medium according to claim 15, wherein the network condition indicative of an error includes at least one of a duplicate packet, a broken packet, and a packet not matching an assumed protocol state.

17. The non-transitory computer-readable medium according to claim 16, wherein the state of the system is recorded by a tracing debugger.

18. The non-transitory computer-readable medium according to claim 17, wherein an internal condition indicative of an error includes at least one of an exception, an illegal peripheral input value, and an error handling code being executed.

19. The non-transitory computer-readable medium according to claim 18, wherein the state of the system is recorded in the form of snapshots and/or incremental logs.

20. The non-transitory computer-readable medium according to claim 19, wherein the recorded state of the system includes memory accesses, task changes, and code executions.

21. The non-transitory computer-readable medium according to claim 20, wherein the network tracer is configured to signal the tracing debugger to store the state of the system at a defined point in time before the network condition indicative of an error was detected and a state trace of the system until the point in time the network condition indicative of an error was detected, or wherein the system is configured to signal the tracing debugger to store the state of the system at a defined point in time before the internal condition indicative of an error was detected and a state trace of the system until the point in time the internal condition indicative of an error was detected, or wherein the tracing debugger is configured to detect the internal condition indicative of an error and to store the state of the system at a defined point in time before the internal condition indicative of an error was detected and a state trace of the system until the point in time the internal condition indicative of an error was detected.

22. The non-transitory computer-readable medium according to claim 21, having additional computer-executable instructions, which, when executed by the at least one processor, cause the at least one processor to perform further operations comprising: providing information on network activity and inner working of the system for analysis.

23. The non-transitory computer-readable medium according to claim 22, having additional computer-executable instructions, which, when executed by the at least one processor, cause the at least one processor to perform further operations comprising: restoring a recorded state on the system and replaying logged network traffic of remote communication partners.

24. The non-transitory computer-readable medium according to claim 23, wherein the recorded state is restored on the system with a modified software code.

25. An apparatus for reproducing a state of a system and a network upon occurrence of an error, the apparatus comprising:
a system analyzer configured to continuously record a state of the system for a time window;
a network analyzer configured to generate a network log for the network and to detect a network condition indicative of an error; and
a storage device configured to store at least a part of the recorded state of the system together with a fitting portion of the network log for the network.

26. The apparatus according to claim 25, wherein the network log for the network is generated by a network tracer.

27. The apparatus according to claim 26, wherein the network condition indicative of an error is detected by the network tracer.

28. The apparatus according to claim 27, wherein the network condition indicative of an error includes at least one of a duplicate packet, a broken packet, and a packet not matching an assumed protocol state.

29. The apparatus according to claim 28, wherein the state of the system is recorded by a tracing debugger.

30. The apparatus according to claim 29, wherein an internal condition indicative of an error includes at least one of an exception, an illegal peripheral input value, and an error handling code being executed.

31. The apparatus according to claim 30, wherein the state of the system is recorded in the form of snapshots and/or incremental logs.

32. The apparatus according to claim 31, wherein the recorded state of the system includes memory accesses, task changes, and code executions.

33. The apparatus according to claim 32, wherein the network tracer is configured to signal the tracing debugger to store the state of the system at a defined point in time before the network condition indicative of an error was detected and a state trace of the system until the point in time the network condition indicative of an error was detected, or wherein the system is configured to signal the tracing debugger to store the state of the system at a defined point in time before the internal condition indicative of an error was detected and a state trace of the system until the point in time the internal condition indicative of an error was detected, or wherein the tracing debugger is configured to detect the internal condition indicative of an error and to store the state of the system at a defined point in time before the internal condition indicative of an error was detected and a state trace of the system until the point in time the internal condition indicative of an error was detected.

34. The apparatus according to claim 33, wherein the apparatus is further configured to provide information on network activity and inner working of the system for analysis.

35. The apparatus according to claim 34, wherein the apparatus is further configures to restore a recorded state on the system and replaying logged network traffic of remote communication partners.

36. The apparatus according to claim 35, wherein the recorded state is restored on the system with a modified software code.

* * * * *